United States Patent
Woo et al.

(10) Patent No.: US 8,299,197 B2
(45) Date of Patent: Oct. 30, 2012

(54) ORGANOSILANE POLYMER WITH IMPROVED GAP-FILLING PROPERTY FOR SEMICONDUCTOR DEVICE AND COATING COMPOSITION USING THE SAME

(75) Inventors: Chang Soo Woo, Suwon-si (KR); Hyun Hoo Sung, Suwon-si (KR); Jin Hee Bae, Suwon-si (KR); Dong Seon Uh, Seoul-si (KR); Jong Seob Kim, Daejeon-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 89 days.

(21) Appl. No.: 12/659,379

(22) Filed: Mar. 8, 2010

(65) Prior Publication Data

US 2010/0167553 A1 Jul. 1, 2010

Related U.S. Application Data

(63) Continuation of application No. PCT/KR2007/007061, filed on Dec. 31, 2007.

(30) Foreign Application Priority Data

Sep. 6, 2007 (KR) .......................... 10-2007-0090677

(51) Int. Cl.
*C08G 77/08* (2006.01)

(52) U.S. Cl. ............. 528/28; 528/26; 528/31; 528/23; 528/29; 427/99.2; 524/861

(58) Field of Classification Search .................. 528/28, 528/29, 31, 23, 26; 524/861; 427/99.2
See application file for complete search history.

(56) References Cited

U.S. PATENT DOCUMENTS

| | | | |
|---|---|---|---|
| 5,840,821 A | 11/1998 | Nakano et al. | |
| 6,331,605 B1 | 12/2001 | Lunginsland et al. | |
| 6,395,856 B1 * | 5/2002 | Petty et al. | 528/24 |
| 6,852,367 B2 * | 2/2005 | You et al. | 427/387 |
| 7,678,529 B2 * | 3/2010 | Ogihara et al. | 430/270.1 |
| 2003/0109614 A1 | 6/2003 | Luginsland et al. | |
| 2004/0028915 A1 | 2/2004 | Shibuya et al. | |
| 2004/0109950 A1 * | 6/2004 | Adams et al. | 427/387 |
| 2004/0171482 A1 * | 9/2004 | Pinnavaia et al. | 502/158 |
| 2006/0069171 A1 * | 3/2006 | Prokopowicz et al. | 521/61 |
| 2007/0026689 A1 * | 2/2007 | Nakata et al. | 438/781 |
| 2008/0118875 A1 * | 5/2008 | Kim et al. | 430/327 |
| 2009/0148789 A1 * | 6/2009 | Amara et al. | 430/270.1 |

FOREIGN PATENT DOCUMENTS

| | | |
|---|---|---|
| JP | 03-116733 A | 5/1991 |
| JP | 11-181352 A | 7/1999 |
| TW | 546326 | 8/2003 |
| TW | 575610 | 2/2004 |

* cited by examiner

*Primary Examiner* — Margaret Moore
(74) *Attorney, Agent, or Firm* — Lee & Morse, P.C.

(57) ABSTRACT

A polymer for gap-filling in a semiconductor device, the polymer being prepared by polycondensation of hydrolysates of the compound represented by Formula 1, the compound represented by Formula 2, and one or more compounds represented by Formulae 3 and 4:

$$[RO]_3Si-[CH_2]_n-Si[OR]_3 \quad (1)$$

wherein n is from 0 to 2 and each R is independently a $C_1$-$C_6$ alkyl group;

$$[RO]_3Si-[CH_2]_nX \quad (2)$$

wherein X is a $C_6$-$C_{12}$ aryl group, n is from 0 to 2, and R is a $C_1$-$C_6$ alkyl group;

$$[RO]_3Si-R' \quad (3)$$

wherein R and R' are independently a $C_1$-$C_6$ alkyl group; and $$[RO]_3Si-H \quad (4)$$

wherein R is a $C_1$-$C_6$ alkyl group.

11 Claims, No Drawings

ORGANOSILANE POLYMER WITH IMPROVED GAP-FILLING PROPERTY FOR SEMICONDUCTOR DEVICE AND COATING COMPOSITION USING THE SAME

CROSS-REFERENCE TO RELATED APPLICATION

This application is a continuation of pending International Application No. PCT/KR2007/007061, entitled "Organosilane Polymer with Improved Gap Filling Property for Semiconductor Device and Coating Composition Using the Same," which was filed on Dec. 31, 2007, the entire contents of which are hereby incorporated by reference.

BACKGROUND

1. Field

Embodiments relate to an organosilane polymer with improved gap-filling property for a semiconductor device and a coating composition using the same.

2. Description of the Related Art

An ideal coating composition for gap-filling in a semiconductor device preferably meets the following requirements: (1) holes whose aspect ratio (i.e. height/diameter ratio) is 1 or more and diameter is 70 nm or less in a substrate are able to be completely filled by a general spin-coating technique and the substrate is able to be planarized to have a uniform thickness; (2) no air voids and cracks are present in the coating film; (3) the thickness of the film is uniform regardless of the density of the holes in the substrate; (4) the planarized film is able to be removed at a desired rate by the treatment with a hydrofluoric acid solution after thermal curing without leaving any residue inside the holes; and (5) the coating composition is stable during storage.

The most basic gap-filling properties of a coating composition in a semiconductor device may be largely dependent on the molecular weight of a polymer contained in the composition. The gap-filling properties of a general coating composition tend to be more advantageous when the molecular weight of a polymer contained in the composition is lower. So long as complete gap filling is achieved, the gap-filling properties of a polymer or a composition including the polymer in a semiconductor device would be excellent as the molecular weight of the polymer increases.

Carbon-based polymers have been used for gap-filling in semiconductor devices. Recent miniaturization of semiconductor devices has led to a reduction in the size of holes to below 70 nm. However, when conventional carbon-based polymers are finally removed by ashing, the inner surfaces of holes are toughened, which causes difficulty in applying dielectric materials in the subsequent processing step. Further, margins for the gap-filling properties of polymers largely depend on the molecular weight range of the polymers where complete gap filling is achieved.

SUMMARY

Embodiments are directed to an organosilane polymer with improved gap-filling property for a semiconductor device and a coating composition using the same, which substantially overcome one or more problems due to the limitations and disadvantages of the related art.

It is a feature of an embodiment to provide a polymer for gap-filling in a semiconductor device that has excellent gap-filling properties and can be readily removed from holes by the treatment with a hydrofluoric acid solution after being cured by baking.

It is a feature of an embodiment to provide a composition including the polymer.

At least one of the above and other features and advantages may be realized by providing a polymer for gap-filling in a semiconductor device, the polymer being prepared by polycondensation of hydrolysates of the compound represented by Formula 1, the compound represented by Formula 2, and one or more compounds represented by Formulae 3 and 4:

$$[RO]_3Si-[CH_2]_n-Si[OR]_3 \quad (1)$$

wherein n is from 0 to 2 and each R is independently a $C_1$-$C_6$ alkyl group;

$$[RO]_3Si-[CH_2]_nX \quad (2)$$

wherein X is a $C_6$-$C_{12}$ aryl group, n is from 0 to 2, and R is a $C_1$-$C_6$ alkyl group;

$$[RO]_3Si-R' \quad (3)$$

wherein R and R' are independently a $C_1$-$C_6$ alkyl group; and

$$[RO]_3Si-H \quad (4)$$

wherein R is a $C_1$-$C_6$ alkyl group.

The polymer may be a condensation product of hydrolysates prepared by the reaction of about 5 to about 90 parts by weight of the compound of Formula 1, about 5 to about 90 parts by weight of the compound of Formula 2, and about 5 to about 90 parts by weight of the compound of Formula 3 in about 5 to about 900 parts by weight of a solvent, based on 100 parts by weight of the sum of the compounds.

The polymer may be a condensation product of hydrolysates prepared by the reaction of about 5 to about 85 parts by weight of the compound of Formula 1, about 5 to about 85 parts by weight of the compound of Formula 2, about 5 to about 85 parts by weight of the compound of Formula 3, and about 5 to about 85 parts by weight of the compound of Formula 4 in about 5 to about 900 parts by weight of a solvent, based on 100 parts by weight of the sum of the compounds.

At least one of the above and other features and advantages may also be realized by providing a polymer for gap-filling in a semiconductor device, the polymer being represented by Formula 5:

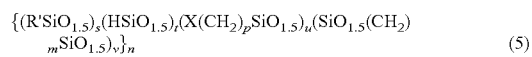

$$\{(R'SiO_{1.5})_s(HSiO_{1.5})_t(X(CH_2)_pSiO_{1.5})_u(SiO_{1.5}(CH_2)_mSiO_{1.5})_v\}_n \quad (5)$$

wherein:

s, t, u, and v satisfy the relations s+t+u+v=1, 0<u, and 0<v, provided that s and t are not simultaneously zero, X is a $C_6$-$C_{12}$ aryl group, R' is a $C_1$-$C_6$ alkyl group, p and m are independently from 0 to 2, and n is 1 or more.

In Formula 5, s, t, u, and v may satisfy the relations $0 \leq s \leq 0.9$, $0 \leq t \leq 0.9$, $0.05 \leq u \leq 0.9$, and $0.05 \leq v \leq 0.9$, provided that s and t are not simultaneously zero, and n may be about 12 to about 2,000.

The polymer may have a weight average molecular weight of about 1,000 to about 100,000.

At least one of the above and other features and advantages may also be realized by providing a composition for gap-filling in a semiconductor device, the composition including the polymer according to an embodiment and an organic solvent.

The polymer may be present in an amount of about 1 to about 50 parts by weight, based on 100 parts by weight of the composition.

The composition may further include a crosslinker and an acid catalyst.

The crosslinker may include one or more of melamine-based crosslinkers, substituted urea-based crosslinkers, epoxy-containing polymers, and derivatives thereof.

The crosslinker may be present in an amount of about 0.1 to about 30 parts by weight, based on 100 parts by weight of the polymer.

The acid catalyst may include one or more of mineral acids, sulfonic acid, oxalic acid, maleic acid, hexamic cyclohexyl-sulfonic acid, and phthalic acid.

The acid catalyst may be present in an amount of about 0.01 to about 10 parts by weight, based on 100 parts by weight of the polymer.

The composition may further include an anhydride stabilizer.

The anhydride stabilizer may be present in an amount of about 0.01 to about 10 parts by weight, based on 100 parts by weight of the polymer.

The organic solvent may include one or more of alcohols, esters, ethers, and cyclic ketones.

The organic solvent may be present in an amount of about 100 to about 3,000 parts by weight, based on 100 parts by weight of the polymer.

The composition may further include a surfactant.

At least one of the above and other features and advantages may also be realized by providing a method of fabricating a semiconductor device, the method including providing a substrate, forming a layer on the substrate using the composition according to an embodiment, and removing the layer using a wet etch process.

DETAILED DESCRIPTION

Korean Patent Application No. 10-2007-0090677, filed on Sep. 6, 2007, in the Korean Intellectual Property Office, and entitled: "Organosilane Polymer With Improved Gap-Filling Property for Semiconductor Device and Coating Composition Using the Same," is incorporated by reference herein in its entirety.

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope of the invention to those skilled in the art.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a solvent" may represent a single compound, e.g., cyclopentanone, or multiple compounds in combination, e.g., cyclopentanone mixed with hydroxyethyl acetate.

Embodiments relate to a polymer with excellent gap-filling properties that is suitable for use in the fabrication of a semiconductor device, and a composition using the polymer.

The gap-filling composition according to an embodiment may be used to completely fill holes having an aspect ratio of 1 or more in a semiconductor substrate by spin coating. In addition, the gap-filling composition may be completely removed from holes without leaving residue by the treatment with a hydrofluoric acid solution after being cured by baking. Furthermore, the gap-filling composition may be highly stable during storage. Therefore, the gap-filling composition may be suitable for use in the fabrication of semiconductor devices.

An embodiment provides a polymer for gap-filling in a semiconductor device wherein the polymer is prepared by polycondensation of hydrolysates of the compound represented by Formula 1, the compound represented by Formula 2, and one or more compounds represented by Formulae 3 and 4:

$$[RO]_3Si-[CH_2]_n-Si[OR]_3 \quad (1)$$

wherein n is from 0 to 2 and each R is independently a $C_1$-$C_6$ alkyl group;

$$[RO]_3Si-[CH_2]_nX \quad (2)$$

wherein X is a $C_6$-$C_{12}$ aryl group, n is from 0 to 2 and R is a $C_1$-$C_6$ alkyl group;

$$[RO]_3Si-R' \quad (3)$$

wherein R and R' are independently a $C_1$-$C_6$ alkyl group; and $$[RO]_3Si-H \quad (4)$$

wherein R is a $C_1$-$C_6$ alkyl group.

In an embodiment, the polymer may be represented by Formula 5:

$$\{(R'SiO_{1.5})_s(HSiO_{1.5})_t(X(CH_2)_pSiO_{1.5})_u(SiO_{1.5}(CH_2)_mSiO_{1.5})_v\}_n \quad (5)$$

wherein s, t, u, and v satisfy the relations s+t+u+v=1, 0≤s≤0.9, for example 0.05≤s≤0.9, 0≤t≤0.9, 0<u, for example 0.05≤u≤0.9, and 0<v, for example 0.05≤v≤0.9, provided that s and t are not simultaneously zero, X is a $C_6$-$C_{12}$ aryl group, R' is a $C_1$-$C_6$ alkyl group, p and m are independently from 0 to 2, and n is 1 or more, for example about 12 to about 2,000.

In another embodiment, the polymer may be a condensation product of hydrolysates prepared by the reaction of about 5 to about 90 parts by weight of the compound of Formula 1, about 5 to about 90 parts by weight of the compound of Formula 2, and about 5 to about 90 parts by weight of the compound of Formula 3 in about 5 to about 900 parts by weight of a solvent, based on 100 parts by weight of the sum of the compounds.

In another embodiment, the polymer may be a condensation product of hydrolysates prepared by the reaction of about 5 to about 85 parts by weight of the compound of Formula 1, about 5 to about 85 parts by weight of the compound of Formula 2, about 5 to about 85 parts by weight of the compound of Formula 3, and about 5 to about 85 parts by weight of the compound of Formula 4 in about 5 to about 900 parts by weight of a solvent, based on 100 parts by weight of the sum of the compounds.

A relatively high content of the compound of Formula 1 may enhance the hydrophilicity of the hydrolysates or the final polycondensate. For example, the gap-filling properties of the final polymer can be improved in a hydrophilic patterned substrate by the use of an increased amount of the compound of Formula 1.

When dry etching is needed, the content of the aryl groups in the compound of Formula 2 may be varied to control the etch rate. The dry etch rate may decrease with increasing content of the aryl groups. Further, the use of the compound of Formula 2 in a relatively large amount may facilitate the control of the hydrolysis and condensation reactions, contributing to the prevention of gelation and improving the coatability of the final polymer.

The silicon (Si) content of the final polymer may be relatively increased with increasing content of the compound of Formula 3 or 4. The wet etch rate of the polymer with a hydrofluoric acid solution may be controlled by varying the silicon content of the polymer. The wet etch rate may increase with increasing silicon content.

The gap-filling polymer according to an embodiment preferably has a weight average molecular weight of about 1,000 to about 100,000 and more preferably about 1,000 to about 30,000. Such a molecular weight distribution may be broader than that afforded by related art polymers.

Another embodiment provides a composition for gap-filling in a semiconductor device, where the composition includes the gap-filling polymer and a solvent.

The content of the gap-filling polymer in the composition is preferably about 1 to about 50 parts by weight and more preferably about 1 to about 30 parts by weight, based on 100 parts by weight of the composition.

The solvent may be a single solvent or a mixture of different solvents. When a mixture of different solvents is used, at least one solvent of the mixture may be a high boiling point solvent. The high-boiling point solvent may help to prevent the formation of voids and help dry a film to be formed using the composition at a low rate, thus achieving improved flatness of the film.

The solvent preferably includes one or more of alcohols, esters, ethers and cyclic ketones.

For example, the solvent may include diethylene glycol monomethyl ether, diethylene glycol diethyl ether, ethyl-3-ethoxy propionate, methyl 3-methoxy propionate, cyclopentanone, cyclohexanone, propylene glycol monomethyl ether acetate, propylene glycol dimethyl ether acetate, 1-methoxy-2-propanol, ethyl lactate, cyclopentanone, hydroxyethyl acetate, and the like. To obtain a desired coating thickness, the solvent is preferably used in an amount of about 100 to about 3,000 parts by weight, based on 100 parts by weight of the gap-filling polymer. An alcohol may be added to the composition to improve the solubility of the gap-filling polymer.

After coating, a baking operation may be performed to cause crosslinking of the polymer molecules to cure the gap-filling composition.

The gap-filling composition may further include a crosslinker and an acid catalyst. The crosslinker may help to promote the curing of the composition.

The crosslinker is preferably a melamine-based crosslinker, a substituted urea-based crosslinker, an epoxy-containing polymer, or a derivative thereof. The crosslinker is preferably present in an amount of about 0.1 to about 30 parts by weight, based on 100 parts by weight of the gap-filling polymer.

The acid catalyst preferably includes one or more of mineral acids, sulfonic acid, oxalic acid, maleic acid, hexamic cyclohexylsulfonic acid, and phthalic acid. The acid catalyst is preferably present in an amount of about 0.01 to about 10 parts by weight, based on 100 parts by weight of the gap-filling polymer.

A stabilizer may be added to the gap-filling composition to prevent the deterioration in storage stability of the composition due to the acid catalyst or natural curing. The stabilizer may be an organic or inorganic anhydride and may be included in an amount of about 0.01 to about 10 parts by weight, based on 100 parts by weight of the gap-filling polymer.

A surfactant may be added to the gap-filling composition in the presence or absence of the crosslinker or the acid catalyst to improve the dispersibility, coating thickness uniformity, and gap-filling properties of the composition. The surfactant is preferably added in an amount of 0.001 to about 5 parts by weight, based on 100 parts by weight of the solids content of the composition. Suitable surfactants may include: i) non-ionic surfactants, for example, polyoxyethylene alkyl ethers such as polyoxyethylene lauryl ether, polyoxyethylene stearyl ether, polyoxyethylene cetyl ether and polyoxyethylene oleyl ether, polyoxyethylene alkylallyl ethers such as polyoxyethylene nonylphenol ether, polyoxyethylene polyoxypropylene block copolymers, and polyoxyethylene sorbitan fatty acid esters such as sorbitan monolaurate, sorbitan monopalmitate, sorbitan monostearate, sorbitan monooleate, polyoxyethylene sorbitan monostearate, polyoxyethylene sorbitan trioleate and polyoxyethylene sorbitan tristearate; ii) fluorinated surfactants such as EFTOP EF301, EF303, EF352 (commercially available from Tochem Products Co., Ltd.), MEGAFAC F171, F173 (commercially available from Dainippon Ink and Chemicals Inc.), FLUORAD FC430, FC431 (commercially available from Sumitomo 3M Ltd.), and ASAHI GUARD AG71O, SURFLON S-382, SC1O1, SC102, SC103, SC104, SC105, SC106 (commercially available from Asahi Glass Co., Ltd.); and iii) silicon-based surfactants such as organosiloxane polymer KP341 (commercially available from Shinetsu Chemical Co., Ltd.). These surfactants may be used alone or in combination with of two or more thereof.

The following Examples and Comparative Examples are provided in order to set forth particular details of one or more embodiments. However, it will be understood that the embodiments are not limited to the particular details described.

EXAMPLES

Example 1

488 g of bis(triethoxysilyl)ethane, 150 g of methyltrimethoxysilane and 55 g of phenyltrimethoxysilane were dissolved in 1,617 g of propylene glycol monomethyl ether acetate and 234 g of ethanol in a 3-liter four-neck flask equipped with a mechanical agitator, a condenser, a dropping funnel and a nitrogen inlet tube, and then 156 g of an aqueous nitric acid solution (1,000 ppm) was added thereto. Thereafter, the mixture was allowed to react at 50° C. for one hour. Methanol was removed from the reaction mixture under reduced pressure. The reaction was continued for 15 days while maintaining the reaction temperature at 50° C., yielding a polymer ('Polymer A') having a weight average molecular weight of about 15,000. 10 g of Polymer A was diluted with 100 g of propylene glycol monomethyl ether acetate with sufficient stirring to prepare a gap-filling composition as a solution.

Example 2

10 g of Polymer A prepared in Example 1 was diluted with 100 g of propylene glycol monomethyl ether acetate with sufficient stirring, and 1 g of a melamine-based resin (Cymel 303LF, Cytec, U.S.A.) and 0.1 g of pyridinium p-toluene-sulfonate were added thereto to prepare a gap-filling composition as a solution.

Comparative Example 1

780 g of methyltrimethoxysilane was dissolved in 1,820 g of propylene glycol monomethyl ether acetate in a 3-liter four-neck flask equipped with a mechanical agitator, a condenser, a dropping funnel and a nitrogen inlet tube, and then 216 g of an aqueous nitric acid solution (1,000 ppm) was added thereto. Thereafter, the mixture was allowed to react at 50° C. for one hour. Methanol was removed from the reaction mixture under reduced pressure. The reaction was continued for 15 days while maintaining the reaction temperature at 50° C. After completion of the reaction, hexane was added to the reaction mixture to precipitate a polymer ('Polymer B'). The polymer was found to have a weight average molecular weight of about 15,000. 10 g of Polymer B was diluted with 100 g of propylene glycol propyl ether with sufficient stirring to prepare a gap-filling composition as a solution.

Comparative Example 2

10 g of a phenol-novolac resin having a weight average molecular weight of about 15,000 was sufficiently stirred in 100 g of propylene glycol monomethyl ether acetate to prepare a gap-filling composition as a solution.

The solutions prepared in Examples 1 and 2 and Comparative Examples 1 and 2 were tested for gap-filling properties, removal by a hydrofluoric acid solution and storage stability (variations in molecular weight and coating thickness) in accordance with the following respective methods. The results are shown in Table 1.

(1) Gap-filling Properties

Each of the solutions was spin-coated on a patterned silicon wafer having holes (diameter: 68 nm, height: 1,600 nm) under the same conditions. The coated wafer was baked at 240° C. for 50 seconds to cure the solution. The cross section of the wafer was observed under a scanning electron microscope to identify whether the holes were completely filled with the composition without defects. The composition was judged to be 'excellent' when no voids were observed, 'fair' when it was difficult to classify into voids or few voids were observed, and 'poor' when many voids were observed.

(2) Removal by Hydrofluoric Acid Solution

Each of the solutions was spin-coated on a patterned silicon wafer having holes (diameter: 68 nm, height: 1,600 nm) under the same conditions. The coated wafer was baked at 240° C. for 50 seconds to cure the solution, dipped in a 6.6% hydrofluoric acid solution (an ammonium fluoride buffer solution) at a temperature of 23.0° C. for 30 minutes, washed with distilled water, and sufficiently dried. Thereafter, the cross section of the dried wafer was observed under a scanning electron microscope to identify whether the composition was left inside the holes.

(3) Storage Stability (Variations in Molecular Weight)

After the compositions were stored at 40° C. for 30 days, the molecular weights of the samples were measured. The differences in the molecular weight of the compounds before and after the storage were calculated. Each of the compositions was judged to be 'good' when the difference was within 5% and 'poor' when the difference exceeded 5%.

(4) Storage Stability (Variations in Coating Thickness)

Each of the compositions was spin-coated on an 8" silicon wafer and baked at 240° C. for 50 seconds to form a coating. On the other hand, after the composition was stored at 40° C. for 30 days, the sample was spin-coated on an 8" silicon wafer and baked at 240° C. for 50 seconds to form a coating. The difference in the thickness of the films before and after the storage was calculated. The composition was judged to be 'good' when the difference was within 5% and 'poor' when the difference exceeded 5%.

TABLE 1

| | | | Storage stability | |
|---|---|---|---|---|
| | Gap-filling properties | Removal by hydrofluoric acid solution | Variations in molecular weight | Variations in coating thickness |
| Example 1 | Excellent | Good | Good | Good |
| Example 2 | Excellent | Good | Good | Good |
| Comparative Example 1 | Fair | Good | Good | Good |
| Comparative Example 2 | Poor | Poor | Good | Good |

As can be seen from the results in Table 1, the gap-filling compositions prepared in Examples 1 and 2 could fill the holes whose diameter was below 70 nm and aspect ratio (i.e. height/diameter ratio) was greater than 1 in the semiconductor substrates without any defects, e.g., air voids, by spin coating. In addition, the gap-filling compositions prepared in Examples 1 and 2 could be completely removed from the holes without leaving any residue by the treatment with a hydrofluoric acid solution after being cured by baking. Furthermore, the gap-filling compositions prepared in Examples 1 and 2 were highly stable during storage.

The gap-filling composition according to an embodiment may be suitable for use in the fabrication of semiconductor devices. Embodiments may provide organosilane polymers and compositions using the polymers for gap-filling in semiconductor devices that eliminate the need for ashing, reduce the cost of processing equipment, and can be effectively removed by wet etching using a hydrofluoric acid solution for the removal of oxides present in patterned holes. Also, the polymers or compositions may effectively fill small holes in a substrate.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A composition for gap-filling in a semiconductor device, the composition comprising:
   a polymer as represented by Formula 5:

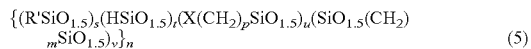

(5)

wherein:
s, t, u, and v satisfy the relations s+t+u+v=1, 0<u, and 0<v, provided that s and t are not simultaneously zero,
X is a $C_6$-$C_{12}$ aryl group,
R' is a $C_1$-$C_6$ alkyl group,
p and m are independently from 0 to 2, and
n is 1 or more;
an organic solvent, wherein the organic solvent is present in an amount of about 100 to about 3,000 parts by weight, based on 100 parts by weight of the polymer; and
a crosslinker, wherein the crosslinker includes one or more of melamine-based crosslinkers, substituted urea-based crosslinkers, epoxy-containing polymers, and derivatives thereof.

2. The composition as claimed in claim 1, wherein the polymer is present in an amount of about 1 to about 50 parts by weight, based on 100 parts by weight of the composition.

3. The composition as claimed in claim 1, further comprising an acid catalyst.

4. The composition as claimed in claim 3, wherein the acid catalyst includes one or more of mineral acids, sulfonic acid, oxalic acid, maleic acid, hexamic cyclohexylsulfonic acid, and phthalic acid.

5. The composition as claimed in claim 3, wherein the acid catalyst is present in an amount of about 0.01 to about 10 parts by weight, based on 100 parts by weight of the polymer.

6. The composition as claimed in claim 1, wherein the crosslinker is present in an amount of about 0.1 to about 30 parts by weight, based on 100 parts by weight of the polymer.

7. The composition as claimed in claim 1, further comprising an anhydride stabilizer.

8. The composition as claimed in claim 7, wherein the anhydride stabilizer is present in an amount of about 0.01 to about 10 parts by weight, based on 100 parts by weight of the polymer.

9. The composition as claimed in claim 1, wherein the organic solvent includes one or more of alcohols, esters, ethers, and cyclic ketones.

10. The composition as claimed in claim 1, further comprising a surfactant.

11. A method of fabricating a semiconductor device, the method comprising:
providing a substrate;
forming a layer on the substrate using the composition as claimed in claim 1; and
removing the layer using a wet etch process.

* * * * *